United States Patent

[11] 3,614,389

[72] Inventor Imre Malisza
 1404 Daugall Ave., Windsor, Ontario, Canada
[21] Appl. No. 792,562
[22] Filed Jan. 21, 1969
[45] Patented Oct. 19, 1971

[54] ELECTRICALLY HEATED DENTAL WAX SUPPLYING AND MANIPULATING TOOLS
 4 Claims, 7 Drawing Figs.

[52] U.S. Cl. .................................................. 219/421,
 32/70, 126/343.5 A, 219/230, 219/233, 219/300,
 222/146 HE, 239/134
[51] Int. Cl. .......................................................... H05b 1/00,
 F27b 14/06
[50] Field of Search ..................... B67d/5/62; 219/421–428,
 300, 301, 230, 307; 222/146, 146
 HE, 146 H; 239/133–135; 126/343.5, 343.5 A;
 32/70; 401/1, 2

[56] References Cited
 UNITED STATES PATENTS

| | | | |
|---|---|---|---|
| 383,536 | 5/1888 | Newman | 219/301 UX |
| 945,505 | 1/1910 | Fess | 222/146 |
| 1,575,152 | 3/1926 | Battista | 222/146 |
| 1,889,507 | 11/1932 | Watson | 239/135 X |
| 2,271,188 | 1/1942 | Franz | 219/421 |
| 3,095,605 | 7/1963 | Finelt | 219/421 X |
| 3,097,288 | 7/1963 | Dunlap | 219/307 |
| 3,221,937 | 12/1965 | Kamborian | 222/146 |
| 3,364,577 | 1/1968 | Oakleaf et al. | 219/421 X |
| 3,406,276 | 10/1968 | Haas | 219/421 |
| 3,443,059 | 5/1969 | Spencer | 222/146 X |

*Primary Examiner*—A. Bartis
*Attorney*—Hauke, Krass, Gifford and Patalidis

ABSTRACT: A dental wax shaping and supplying tool includes an electrically heated, pressurized wax reservoir for heating a mass of wax to the desired temperature. Molten wax is selectively discharged from the reservoir through a flow valve in the bottom thereof into an elongated electrically heated flexible tube having connected to its other end an electrically heated spatula for dispensing and shaping the wax. The spatula includes a metallic tube for transmitting the wax from the flexible tube to the spatula spoon. The metal tube is electrically energized to supply heat to the wax flowing therethrough. The wax discharges onto a spatula spoon having an outer rim of electrical resistance material connected to supply heat and a center bowl of electrical insulation.

INVENTOR
IMRE MALISZA

BY Hauke, Kass, Gifford, & Patalidi

ATTORNEYS

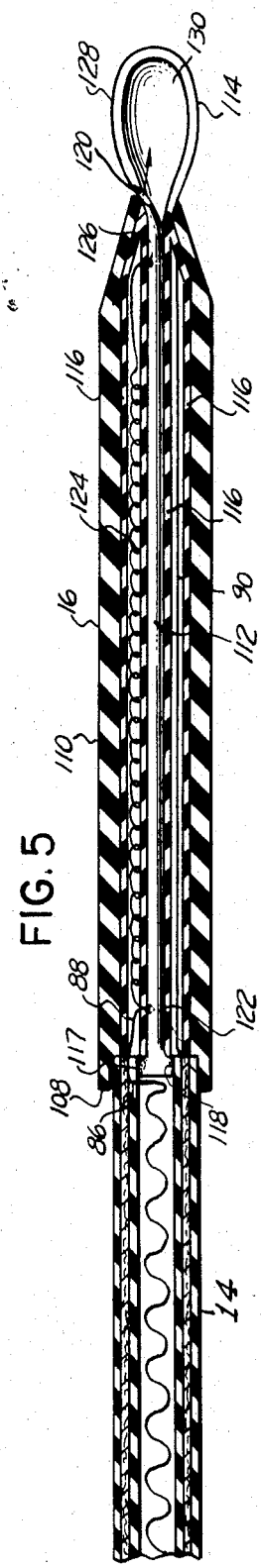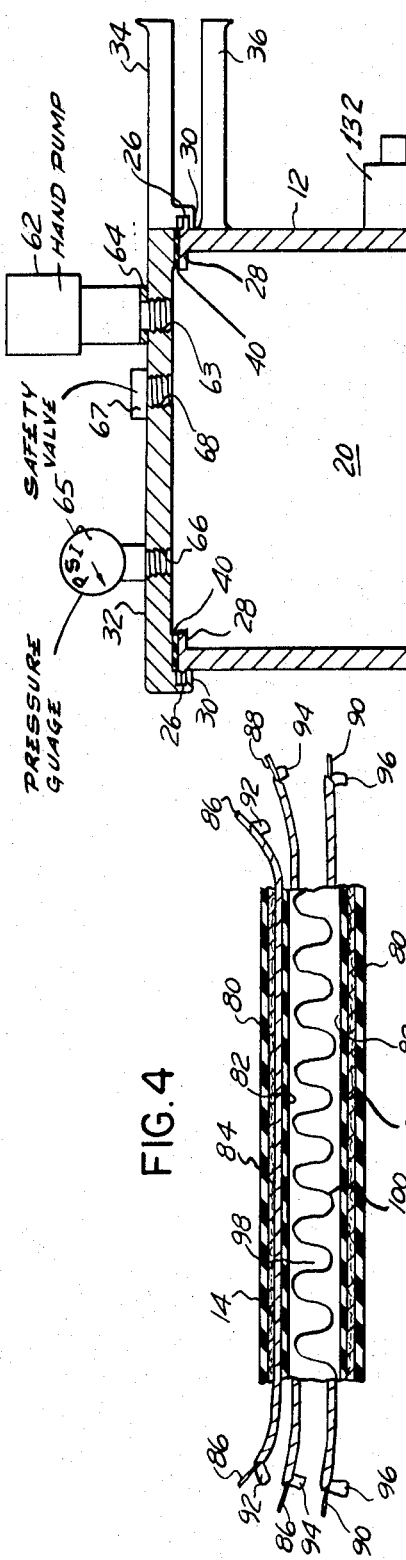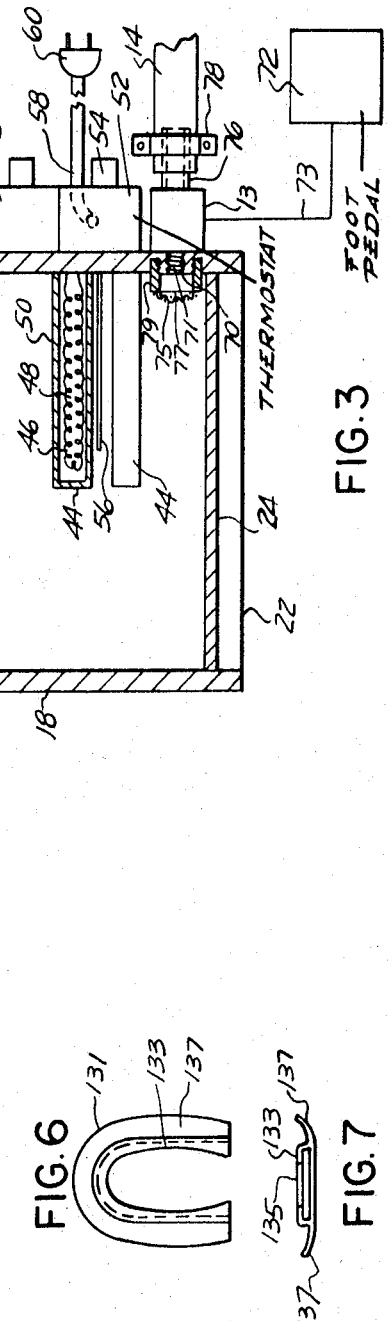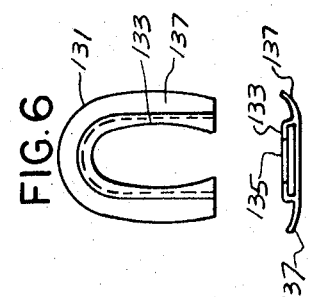
INVENTOR
IMRE MALISZA

ELECTRICALLY HEATED DENTAL WAX SUPPLYING AND MANIPULATING TOOLS

BACKGROUND OF THE INVENTION

1. Field of the Invention

This invention relates to an electrically heated temperature controlled waxing apparatus, that melts wax and conveys it to the point of application by means of a wax reservoir, flexible tube and spatula.

2. Prior Art

The present method of making wax models for dental purposes involves the heating in an open flame, with the aid of a spatula, a small amount of material removed from a sheet or block of dental wax. The amount of wax heated in this manner at a given time is limited in volume, since as soon as it is removed from the flame its temperature is reduced, rendering the application of large quantities of working material impractical.

The melting of small masses of wax is a time-consuming process, since the operator has to remove the wax from the stock, melt it, and then transfer it to the workpiece. The recent proposal of an electrically heated spatula, working on the electrical soldering gun principle, has eliminated the open flame requirement and facilitates the removal of small quantities of wax from the stock. Tools of this type are, however, inefficient because the operator still has to discontinue his productive work while removing and transferring a small piece of wax. They are, moreover, unsatisfactory since the electrically heated surface of the spatula must be operated at a high temperature in order to melt the wax as rapidly as could be accomplished in an open flame. The heated surface has proved to be excessively hot for exacting work on the surfaces of the wax model. The use of lower temperatures to avoid this problem reduces time savings in the work cycle and makes the functional effectiveness of the device questionable as compared with the open flame operation. An additional difficulty with such a device is that the operator must hold the spatula level while transferring material in order to avoid spilling of the molten wax.

A further proposal disclosed in U.S. Pat. No. 3,364,577, issued Jan. 23, 1968, to R. D. Oakleaf, includes a heated, elevated reservoir for holding a supply of molten dental wax. A heated flexible tube is connected between the wax reservoir and an electrically heated supplying and shaping spatula. The spatula includes a wax carrying tube heated by a resistor spiralled therearound and embedded in electrical insulation. A combined heat insulation and grip forms a handle for the spatula.

The disadvantages in this arrangement include the lack of means for controlling the flow of wax from the spatula. A drop of wax is discharged from the spatula when the end of the spatula is touched to the workpiece. When a large volume of wax is needed at one time, as in making dentures, it cannot be obtained easily with this device.

Although it is not stated in the patent, apparently the flexible tube is heated by a heating element contained between the layers of tubing fiber. With this arrangement, plastic or rubber tubing material cannot be used, since at the temperature necessary to keep the wax fluid the tubing material would be burnt. It would be possible to use asbestos or silicon tubing material, but use of these materials would severely limit the flexibility of the tubing. Furthermore, unless the insulation around the heating element was very thick, resulting in excessively bulky stiff tubing, the outside of the tube would become very hot.

Since the wax carrying tube in the spatula is heated by a resistor wrapped therearound, it is necessary to electrically insulate the resistor from the tube. Since electrical insulation is a poor conductor of heat, the resistor must emit an excessive amount of heat in order for enough heat to be transmitted through the insulation and tube to maintain the fluidity of the wax. A large amount of thermal insulation must then be placed around the resistor so that the outer surface of the spatula will be cool enough to allow handling by human hands. This results in an excessively bulky, unmanageable spatula.

SUMMARY OF THE INVENTION

The above disadvantages may be overcome by providing an electrically heated, pressurized wax reservoir, for rapid heating of a large mass of wax to the desired temperature. The molten wax, under pressure, is removed from the reservoir through a discharge opening at the bottom of the reservoir. A foot-operated solenoid-controlled flow valve disposed between the discharge opening and a flexible tube regulates the amount of wax introduced into the tube. An electrically heated spatula for dispensing and shaping the dental wax is connected to the other end of the flexible tube.

The wax reservoir includes a lid allowing access into an airtight wax heating and storage compartment. A pair of heating elements are disposed within the compartment for heating the wax to the desired temperature. When the wax in the compartment has been heated, a small pump or compressor is used to add pressure thereto.

The flexible tube includes inner and outer layers of rubber with thermal insulating material disposed therebetween. Internal to the innermost rubber tube is a spiralled bare wire extending the full length of the tube. The spiralled wire, in direct contact with the wax, is a heating element for maintaining the fluidity of the wax, while the wax provides the insulation between the spiralled wire and the inner layer of tubing and keeps the temperature of the tube at the temperature of the melted wax.

The spatula includes a tube embedded in electrical and thermal insulation for transmitting the molten wax from the flexible tube to the spatula spoon. The electrically connected spatula tube also acts as a resistor for supplying heat to maintain the fluidity of the wax.

The spatula spoon includes an outer edge of electrical resistance material with a center of porcelain or other heat resistant, electrical insulating material. The outer edge of the spoon is electrically connected so as to provide heat, which may be regulated to a desired temperature, to the wax while it is in the spoon.

When molten wax is desired, the solenoid-controlled flow valve is actuated allowing molten wax to be pushed out the discharge opening by the pressure in the reservoir. The molten wax from the reservoir pushes along the wax in the flexible tube. The wax in the flexible tube is maintained in the fluid state by the spiralled wire-heating element. The wax from the flexible tube in turn moves along the molten wax in the spatula tube. The wax in the spatula tube is maintained in the fluid state by the heat from the spatula tube. Molten wax from the spatula tube is pushed onto the spatula spoon where it may be used to make denture patterns.

This arrangement has the advantage over prior dental wax shaping and supplying tools by having means for controlling the flow of wax from the spatula. When a large volume of molten wax is needed at one time, the control valve is activated and a continuous supply of molten wax is available.

Furthermore, by employing a spiralled wire inside the flexible tube as the heating element, it is possible to use rubber as the tubing material, resulting in a tube with the desired flexibility. Since the spiralled wire is well insulated from the outer surface of the tubing, this surface will not be excessively hot. Since the temperature of the wax in the tubing and spatula tip may be regulated and kept at the lowest temperature possible, the shrinkage of the wax will be kept at a minimum, which is a very important factor in dentistry.

Since the spatula tube that also serves as the spatula heating element is in direct contact with the wax, a minimum amount of heat is needed in order to maintain the fluidity of the wax therein. Therefore, a minimum amount of thermal insulation is required around the spatula-heating element in order to maintain the outer surface of the spatula cool enough to allow handling by human hands, resulting in a slim, easy to handle spatula.

DESCRIPTION OF THE DRAWINGS

FIG. 3 is a sectional view taken along line 3—3 of FIG. 1;

FIG. 4 is an enlarged, sectional view of the flexible tubing of FIG. 1;

FIG. 5 is an enlarged, sectional view of the tubing and spatula of FIG. 1;

FIG. 6 is a plan view of a tip member which may be clamped onto the spatula spoon of FIG. 5;

FIG. 7 is a bottom view of the member shown in FIG. 6.

DESCRIPTION OF THE PREFERRED EMBODIMENT

Figure 1:
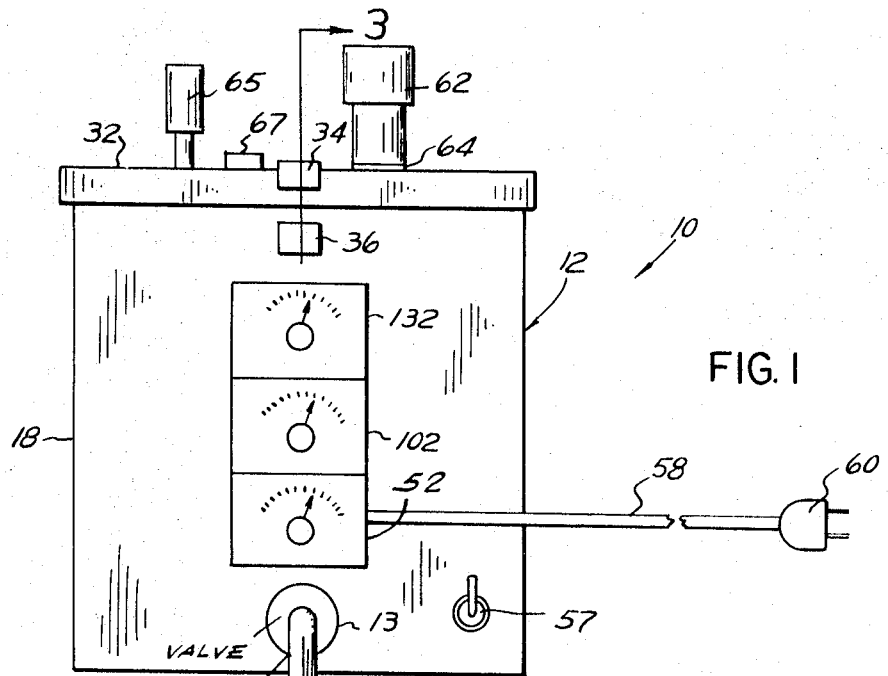
FIG. 1 is an elevational view of a dental wax supplying and manipulating tool forming one embodiment of the invention.

Referring to the drawings, FIG. 1 illustrates a dental wax shaping and supplying tool 10 adapted to supply dental wax at the desired temperature for making denture patterns. Electrically heated, pressurized reservoir 12 holds a supply of wax at a flowable temperature to be supplied through a foot-actuated solenoid-controlled flow valve 13 to a flexible tube 14. The other end of tube 14 is connected to one end of an electrically heated spatula 16 adapted to supply and shape the dental wax.

Figure 2:
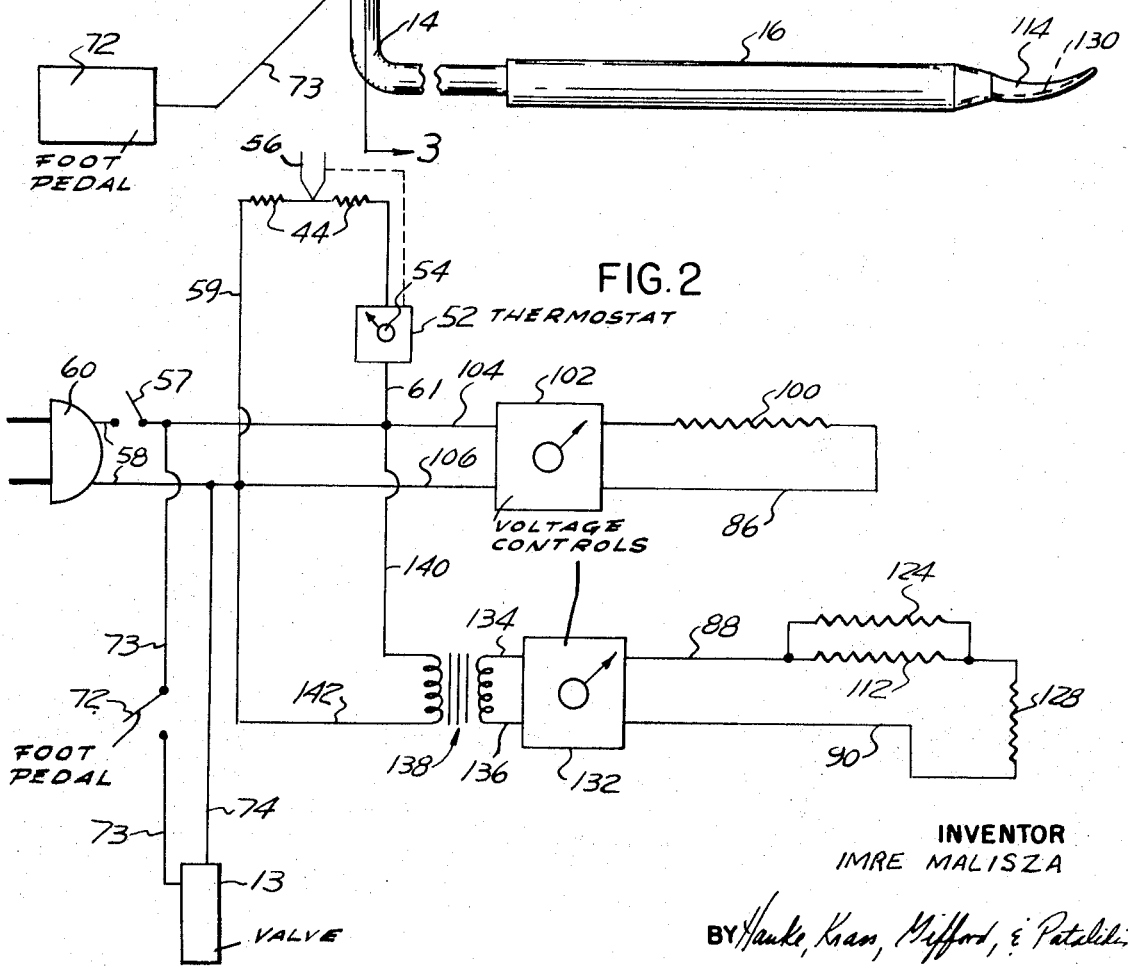
FIG. 2 is a schematic view of a heating circuit of the tool of FIG. 1.

Referring to FIGS. 1, 2 and 3, wax reservoir 12 includes a cylindrical casing 18 forming the sidewalls of wax compartment 20. The lower edge 22 of casing 18 serves as the base of the reservoir. Circular disc 24 disposed within the casing adjacent edge 22 is secured to the inside of the casing, as by welding or other convenient means, forming the bottom wall of compartment 20. Flange 26, spiralled in thread fashion, is formed on the outer surface of casing 18 adjacent top edge for engaging inwardly turned lip 30, also spiralled in thread fashion, formed on lid 32. Handles 34 and 36 secured to lid 32 and casing 18, respectively, aid in turning lid 22 with respect to casing 18 for engaging and disengaging lip 30 from flange 26, allowing the lid to be secured to or removed from the casing. Flange 28 formed on the inner surface of casing 18 adjacent edge extends the edge so as to aid in forming an airtight seal between the casing 18, gasket 40 and toroidal-shaped surface 42 formed on the underside of lid 32, resulting in compartment 20 being completely sealed when lid 22 is tightened down.

With the lid removed dental wax is placed in compartment 20 where it is heated to the desired temperature, preferably from 180° F. to 200° F., by two heating elements 44 disposed within the compartment. Each element 44 is composed of a heating coil 46 disposed within a tubular chamber 48 formed by an outer metal casing 50 of high heat conductivity. Elements 44 are controlled by a thermostat 52 of conventional design having a control knob 54 and a thermocouple 56 positioned between the two heating elements. As better illustrated in FIG. 2, elements 44 receive their power supply through connector plug 60, adapted to connect to a conventional source of power of 110 volts, electrical wires 58 and connecting wires 59 and 61. Master switch 57 connected to one of the wires 58 is provided to turn the unit "on" or "off."

With molten wax filling compartment 20, lid 32 is tightened onto casing 18 by means of flange 26 and lip 30 with the aid of handles 34 and 36. Hand pump 62 of conventional design, which is threaded into opening 63 of lid 32 with gasket 64 forming an airtight seal therebetween, is then used to pressurize compartment 20, preferably from 5 to 15 p.s.i.g. Pressure gauge 65, preferably with a range of from 0 to 20 p.s.i.g., is threaded into pipe threads 66 of lid 32 for indicating the pressure in compartment 20. Safety valve 67 of conventional design, preferably set to release the pressure at above 15 p.s.i.g. is threaded into pipe threads 68 of lid 32.

A solenoid controlled flow valve 13, well known in the art, is threaded into pipe threads 70 of opening 71 formed in casing 18 below heating elements 44. The flow valve is actuated by a foot pedal 72 connected thereto by an electrical cord 73. As better shown in FIG. 2, the solenoid valve receives its electrical power through connector plug 60, electrical cord 58, and wires 73 and 74.

A fine mesh screen 75 of commercially available screening is placed over one of the openings 77 of a cylindrical member 79 and secured thereto as by gluing or by other convenient means. The other end of member 79 is threaded onto threads 81 formed on casing 18 and encircling opening 71. Secured in this manner, the screening ensures that only molten wax enters flow valve 13.

When foot pedal 72 is pushed by pressure therein wax from compartment 20 is actuated opening valve 13, molten through opening 71, valve 13, and into conduit 76 that is fixedly secured as by welding to one end of valve 13. Wax from conduit 76 flows into flexible tube 14 that is secured over the end of the conduit by clamp 78.

As shown in FIG. 4, tube 14 is compound of an outer and inner layer of rubber or plastics 80 and 82, respectively, enclosing a layer of woven fibrous thermal insulating material 84. Disposed between layers 82 and 84 are three electrical wires 86, 88 and 90 wrapped in electrical insulation 92, 94 and 96, respectively, running the full length of tube 14. Disposed within conduit 98 formed by tubing 14 is a spiralled bare wire 100 forming the heating element therein and extending the full length of tube 14. The molten wax surrounding the wire provides the insulation necessary along the internal surface of the tube 14.

Referring to FIGS. 2 and 5, one end of heating element 100 is connected to electrical wire 86 adjacent the end of tube 14. Heater 100 receives its power supply through silicon controlled rectifier variable voltage control 102, preferably with a range of from 12 to 24 volts, that is connected by means of wires 104 and 106 to connector plug 60 and cord 58. Heating element 100 maintains the wax in conduit 98 at a favorable temperature, preferably from 170° F. to 200°F.

Referring to FIG. 5, spatula 16 is press-fitted onto the end of tube 14 by means of a lip 108 formed on one end of a tubular handle 110. The handle 110 formed from thermal insulation encloses spatula tube 112 with both handle and tube extending from tube 14 to the spatula spoon 114. Tube 112 wrapped in electrical and thermal insulation 116 has one end with enlargement 117 formed thereon press-fitted into opening 118 at the end of conduit 98, while the other end opens into spoon 114. Molten wax from conduit 98 flows down tube 112 and into spoon 114 from tube opening 120.

Tube 112 formed from a nickel-chrome alloy or other electrical resistance material serves both as a conduit for the molten wax and as a heating element to maintain the fluidity of the wax. Wire 88 is connected to tube 112 at point 122 that is adjacent the connection between the tube and conduit 98. A ballast resistor wire 124 wrapped in electrical and thermal insulation 116 is connected between point 122 and point 126 on tube 112 adjacent the connection between the tube and spoon 114.

Spoon 114 is an oval cupped shaped member formed with a sharp rim of nickel-chrome alloy or other resistive metal 128. One end of rim 128 is connected to the end of tube 112, while the other end is connected to wire 90, which extends the length of spatula 16 and is wrapped in electrical and thermal insulation 116. The spoon center 130 is formed from a hard, heat resistant, electrical insulating material such as porcelain.

If a larger spoon is desired, tip member 131, shown in FIGS. 6 and 7, can be pushed onto spoon 114. Flange 133 of member 131 forms groove 135, which would clamp to rim 128 of spoon 114. Outer rim 137 would serve to enlarge spoon 114. Tip member 131 is preferably formed from the same material as is rim 128.

Referring to FIGS. 2 and 5, wires 88 and 90 are connected to silicon controlled rectifier variable voltage control 132, preferably with a range of from 1 to 10 volts. Control 132 is connected by wires 134 and 136 to stepdown transformer 138 having a stepdown ratio of preferably 11 to one. Wires 140 and 142 connect the transformer with connector plug 60 and cord 58.

Electrical current from line 88 passes through tube 112 and resistor 124, that is parallel with the tube. The current from the tube and resistor then passes through the heating element 128 and back to control 132 through wire 90. The electrical current passing through tube 112 maintains the wax therein at the desired temperature, preferably 170° F. to 200°F. Rim 128 is maintained at a working temperature, preferably from 200° F. to 600°F. Resistor 124, being both electrically and thermally insulated from tube 112, serves merely to short circuit a part of the electrical current around tube 112. Since all of the current passing through tube 112 and resistor 124 passes through resistor 128, the resistance of 124 sets the ratio of the heat output of tube 112 to resistor 128. If it is desired to change this ratio, the resistor 124 can be replaced by an element having a different resistance.

In operation, lid 32 is removed from casing 18 and dental wax is placed in compartment 20. With the lid replaced, master switch 57 is turned to the "on" position and thermostat 52 set to the desired temperature. Controls 102 and 132 are set to the desired voltage, heating tube 14 and spatula 16 to the appropriate temperatures. When the wax in compartment 20 has been heated to the desired temperature, compartment 20 is pressurized by means of pump 20.

When wax is desired, valve 13 is opened by actuating pedal 72, allowing molten wax from compartment 20 to flow through valve 13 and into tube 14, where heating element 100 maintains the fluidity of the wax. From tube 14 the wax flows into spatula tube 112, where heat from tube 112 maintains the wax at the desired temperature. From tube 112 molten wax flows into spoon 114, where it is maintained at the desired temperature by rim 128 for use in making dental patterns. By this arrangement, the supply of molten wax may be started or stopped merely by actuating foot pedal 72.

When the device is not in use, main switch 57 may be turned to the "off" position, allowing the circuit to cool to room temperature. When wax is desired, switch 57 is turned on, heating the wax in compartment 20, tube 14 and spatula 16 to the desired temperature.

Although I have described but one embodiment of my invention, it is to be understood that various changes and revisions can be made therein without departing from the spirit of the invention as expressed in the scope of the appended claims.

I claim:

1. A device for supplying dental wax comprising: a reservoir for storing wax and having an outlet port, first heating means operatively connected to said reservoir for heating wax contained therein, means connected to said reservoir for raising the pressure within said reservoir, a flexible tube having first and second ends with the first end thereof connected to said outlet port, an elongated spatula having a first end connected to said second of said tube so that wax may be conveyed from said reservoir to said spatula, said spatula having a dispensing tip for applying wax at the second end thereof, said dispensing tip being a generally cupped member with an outer rim of electrically resistive material connected to a source of electrical power and an electrically insulated central portion, valve means for controlling the flow of wax to said dispensing tip, second heating means disposed along said tube for heating wax as it moves along said tube.

2. A device as set forth in claim 1 wherein said second heating element includes a spiralled bare wire disposed within said tube in direct contact with the wax.

3. A device as set forth in claim 1 wherein said spatula includes a spatula tube connected between the second end of the flexible tube and said dispensing tip for conveying wax therebetween.

4. A device as set forth in claim 3 wherein said spatula tube includes a resistance element connected to a source of electrical power for heating the wax passing therethrough.